United States Patent [19]

Owens

[11] 4,170,099
[45] Oct. 9, 1979

[54] POWER MOWER EDGER AND TRIMMER ATTACHMENT

[76] Inventor: Boyd L. Owens, P.O. Box 142, Cartersville, Okla. 74934

[21] Appl. No.: 894,061

[22] Filed: Apr. 6, 1978

[51] Int. Cl.² .................. A01D 53/14; A01D 50/02
[52] U.S. Cl. ................................ 56/16.9; 56/12.7; 56/13.6; 56/256
[58] Field of Search ............ 56/16.9, 12.7, 13.6, 56/13.7, 11.6, 255

[56] References Cited
U.S. PATENT DOCUMENTS

| 2,771,730 | 11/1956 | True | 56/11.6 |
| 2,908,127 | 10/1959 | Craig | 56/13.7 |
| 2,910,817 | 11/1959 | Smith et al. | 56/13.7 |
| 3,053,035 | 9/1962 | Earley | 56/256 |
| 3,236,037 | 2/1966 | Porterfield | 56/13.7 |
| 3,319,406 | 5/1967 | Miles | 56/13.7 |
| 3,531,922 | 10/1970 | Hansen | 56/13.7 |
| 3,668,845 | 6/1972 | Parker | 56/11.6 |
| 3,710,563 | 1/1973 | Polette et al. | 56/16.9 |

Primary Examiner—Russell R. Kinsey
Attorney, Agent, or Firm—Dowell & Dowell

[57] ABSTRACT

A grass edger and trimmer attachment for a power mower including a vertical trimmer shaft mounted in a bearing fixed to the side of the mower housing, the trimmer shaft being driven by a pulley which is belt-driven by the mower engine, and the trimmer shaft supporting a trimmer hub carrying flail members at a level below the skirt of the mower housing, and the attachment further including an arm hinged to the housing and carrying an edger shaft with a drive roller thereon and an edger hub at its outer end with flail members fixed to the periphery of the hub, the drive roller engaging the trimmer drive pulley and being driven thereby when the arm and the edger shaft are substantially horizontal, but the arm being tiltable about the hinge to an elevated position wherein the roller is disengaged and the edger hub and flail members are raised out of operative position.

4 Claims, 5 Drawing Figures

POWER MOWER EDGER AND TRIMMER ATTACHMENT

FIELD OF INVENTION

This invention relates to edger and trimmer attachments to be added to an ordinary rotary lawn mower, and more particularly relates to attachments for edging and trimming grass wherein the attachments can be selectively engaged and disengaged while the mower engine is running

BACKGROUND AND PRIOR ART

It is well known in the art that the ordinary engine driven mower is unable to pass close enough to a raised obstruction to cut the grass all the way up to its edge, and it is also well known that the ordinary mower is not equipped for trimming and edging purposes. Accordingly, separate machines are sold for these two purposes, the same machine often performing either edging or trimming depending on whether the shaft of the machine is held in a horizontal or a vertical position during use.

Numerous attempts have been made to provide an attachment for present-type mowers to accomplish these trimming and edging functions, for instance as shown in U.S. Pat. No. 3,531,922 to Hensen. This patent shows both edging and trimming means, but no provision is made for moving the edger away when only trimming is desired.

U.S. Pat. No. 2,663,137 to Asbury; U.S. Pat. No. 3,192,693 to Bergeson; U.S. Pat. No. 3,812,917 to Strate; U.S. Pat. No. 3,871,160 to Hooper and U.S. Pat. No. 3,407,579 to Decker, all show trimming or edging attachments for a lawn mower, but both types of attachments also combined in the same device. Some of these patents show various and sundry means for tightening and loosening a drive belt so that the attachment can be disabled when its function is not needed, for instance U.S. Pat. No. 3,407,579 having a movable idler pulley pressing against the drive belt to tighten it. Additionally, U.S. Pat. No. 2,663,137 shows an edger of the type using flexible flail members instead of rigid blades.

THE INVENTION

The present invention comprises an attachment for a power mower which has two different shafts selectively driven from the main engine shaft. The shaft for the trimmer is permanently mounted in a vertical bearing secured to the side of the mower housing so that the shaft extends down below the skirt of the housing and carries a horizontal hub to which flexible flail members are attached. The housing has a slot in it and a drive belt passes through the slot, around a pulley on the top of the trimmer shaft and around a pulley mounted on the main engine shaft just above the main grass cutter blades. A control is provided to tighten and loosen the belt. The edger attachment comprises another bearing supported on an arm and carrying a shaft extending beyond the outer end of the arm. The inner end of the arm is mounted on a hinge fixed to the housing in such a location that when the arm is pivoted to place the shaft in a substantially horizontal position, the edger shaft overlies the top of the trimmer pulley and is driven by a roller supported on the edger shaft and riding on top of the pulley. The edger shaft has an edger hub mounted at its outer end which also supports flail members. The edger arm is spring-urged into a position wherein the roller is driven by contact with the top of the trimmer pulley, but means are provided for holding the arm in a raised disengaged position.

It is a principal object of this invention to provide an improved edger and trimmer attachment for a lawn mower which can be quickly and easily mounted thereon, and which is lightweight and inexpensive to construct.

It is a further object of this invention to provide a combined edger and trimmer attachment in which the drives to both hubs and flail members can be selectively disengaged, and in which the edger member can be pivoted upwardly and held out of its normal operating position.

Still another object of the invention is to provide an edger and trimmer attachment which makes use of flexible flail members so that when the attachments are not in use, they do not present a hazard to persons working around the lawn mower, as is the case with attachments using rigid blades.

Other objects and advantages of the invention will become apparent during the following discussion of the drawings:

THE DRAWINGS

DESCRIPTION OF PREFERRED EMBODIMENT

Figure 1:
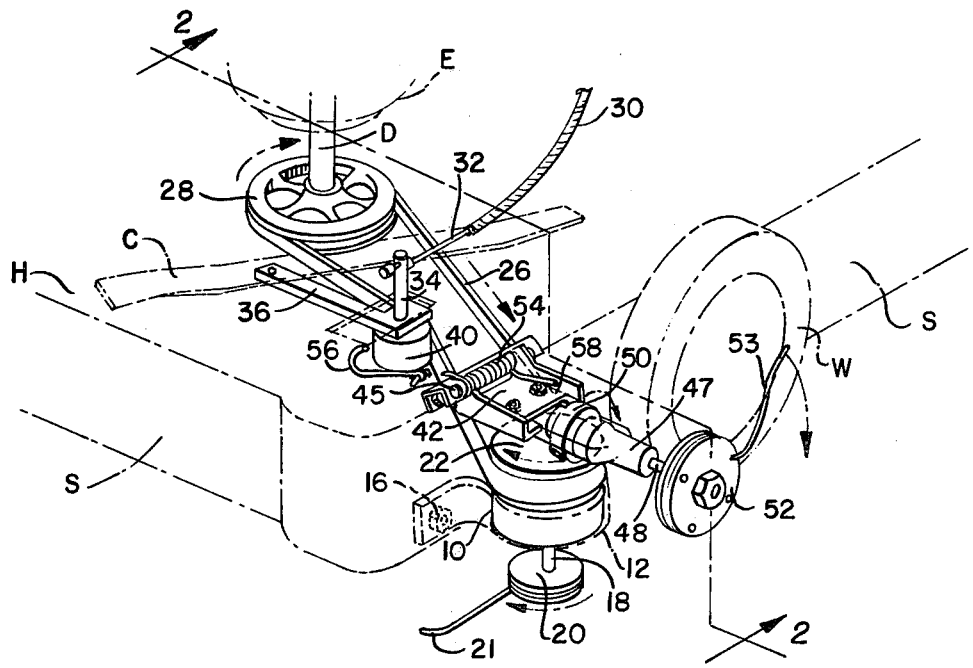
FIG. 1 is a perspective view of the attachment shown in relationship with a phantom-line outline of the mower housing.
Figure 2:
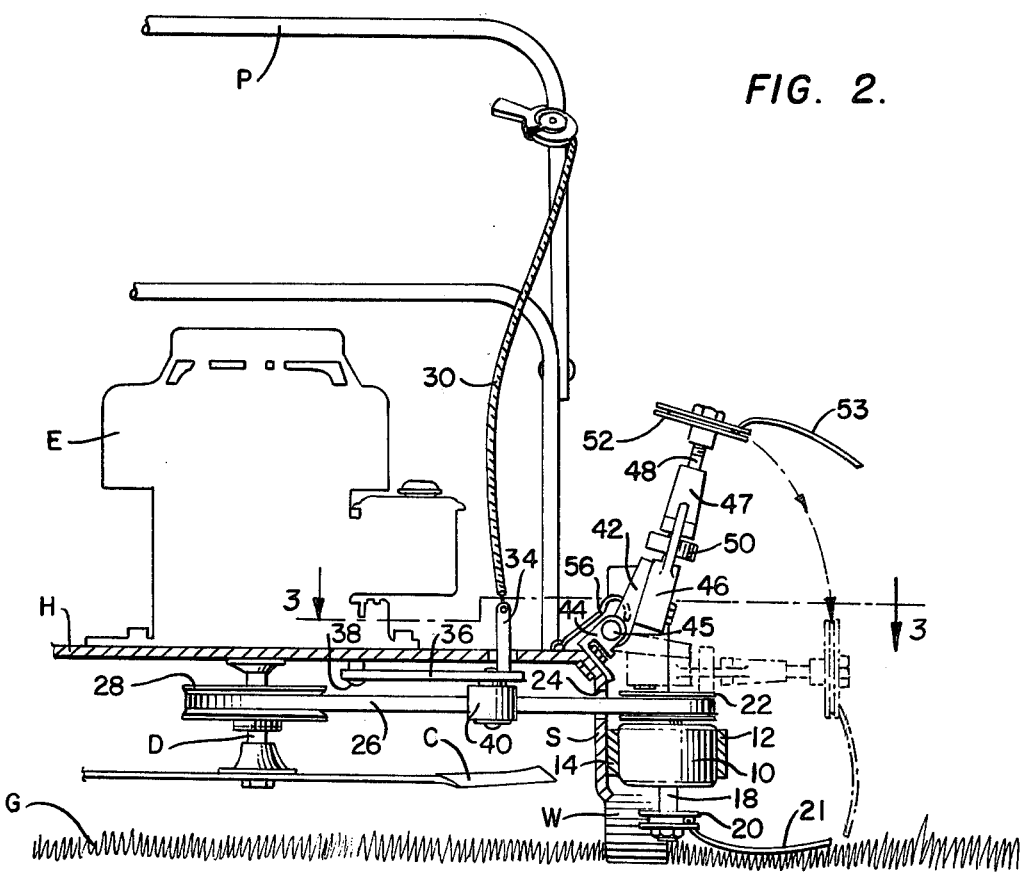
FIG. 2 is a partial view partly in section taken along line 2—2 of FIG. 1 and showing important components of the mower in solid lines.
Figure 3:
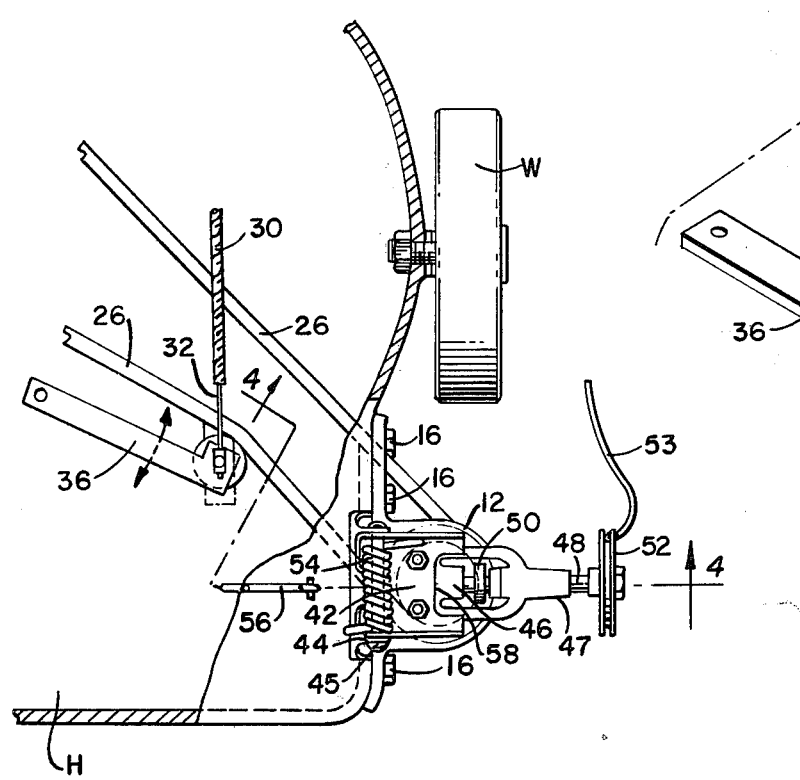
FIG. 3 is a partial sectional view taken along line 3—3 of FIG. 2.
Figure 5:
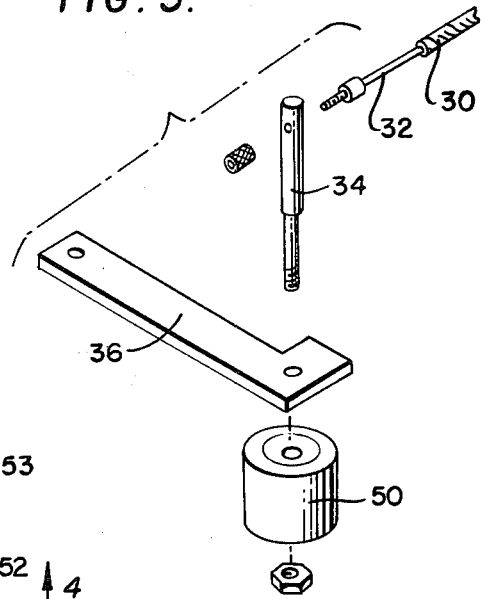
FIG. 5 is an exploded view of the belt tightening idler mechanism for controlling operation of the attachment by power taken from the main engine drive shaft.
Figure 4:
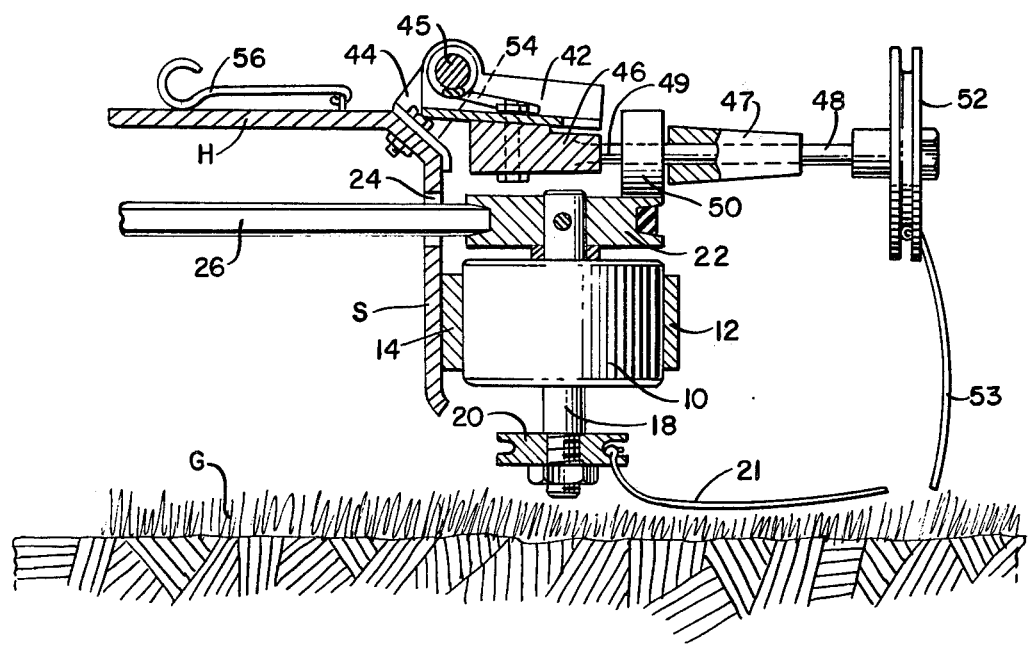
FIG. 4 is a sectional view of the attachment taken along line 4—4 of FIG. 3.

Referring now to FIGS. 1 and 2, the attachment is shown mounted on a lawn mower of the rotary type having a housing H with a downwardly extending skirt S, the mower having a drive shaft D driven by an engine E and supporting main cutter blades C. The mower rolls on wheels W and has a push handle P extending above the housing H. In FIGS. 2 and 4, the mower is shown in relationship to grass G growing from the earth. The above mentioned main parts of the mower are considered conventional and form no part of the present invention.

The edging and trimming attachment according to this invention comprises a bearing member 10 which is supported in a U-shaped strap 12 bolted to the side of the skirt S of the housing. The bearing can be spaced from the side of the housing by a suitable spacer 14 against which it is tightly confined by bolts 16 holding the strap 12 in place. The bearing supports a vertically oriented trimmer shaft 18 having a hub 20 attached to its lower end, the hub being drilled to provide a hole to receive and support flail members 21 comprising, for example, wire cables or nylon filament, all of which are well known in the prior art. The upper end of the shaft has a pulley 22 mounted thereon which has a smooth upper drive surface for the purpose hereinafter stated. The skirt S in the vicinity of this assembly is slotted as at 24, and a drive belt 26 passes through the slot 24, around the pulley 22, and around another pulley 28 which is fixed on the main drive shaft D to drive the shaft 18 when the belt 26 is tensioned in a manner to be hereinafter explained.

The length of the belt 26 is selected so that it will be loose on the pulleys 22 and 28 unless the belt is deliberately tightened thereon. This provides a degree of control achieved by using a Bowden wire arrangement 30 which has a control wire 32 whose outer end is attached to a vertical control rod 34 which is fixed in a lever arm 36 attached to the housing H by a pivot 38, which can be seen best in FIG. 2. When the attachments are disengaged, the belt 26 lies loosely on the pulleys 22 and 28 and does not drive the shaft 18, but when the Bowden wire control cable 32 is actuated to tighten the belt the arm 36 pivots in a direction to move an idler 40 against the belt and thereby cause the belt to grip the pulleys so that drive is furnished from the pulley 28 to the pulley 22, whereby the shaft 18 is caused to rotate. Thus, the Bowden wire cable 30 controls all power transfer to the attachment and this also includes transfer to the edger attachment which is about to be described in detail.

The edger attachment comprises an arm 42 which can be seen best in FIG. 4. The arm 42 is pivotally attached by a hinge 44 to the housing H, and the arm carries a bearing 46 which supports an edger shaft 48, the bearing 46 having an outer portion 47 which guides the shaft 48 and provides an exposed intermediate portion of the shaft 49 to which a roller 50 is fixed. The outer end of the shaft 48 supports a hub 52 which is slotted and provided with flail members 53 as shown in the drawings. Although only one flail member 21 or 53 is shown on each of the respective hubs 20 and 52, it is to be understood that the hubs will support multiple flail members uniformly spaced around their peripheries.

The hinge 44 has a hinge pin 45 extending therethrough, and a spring 54 is coiled around the hinge pin 45 in such a way as to press the arm 42 in a clockwise direction, and thereby urge the roller 50 into contact with the top drive-surface of the pulley 22. The roller 50 has a rubber periphery which frictionally engages the top of the pulley 22 and drives the shaft 48 therefrom. The pressure of the spring 54 is such as to provide proper engagement between the roller 50 and the pulley 22 in order to achieve reliable rotation of the shaft 48. However, slackening of the pull on the Bowden wire 30 will release the belt 26 and stop the rotation of both the edger hub and the trimmer hub. The edger feature can also be disengaged by raising the arm 42 to the position shown in FIG. 2 and hooking it in that position by engaging the hook 56 into the recess 58 in the outer portion of the arm 42, the recess being visible in FIG. 1. When the edger arm 42 is raised as shown in FIG. 2, the roller 50 is disengaged from the top of the pulley 22 and thus the shaft 48 stops rotating. However, when the edger is thus raised the trimmer portion of the attachment can still be fully operative to trim the grass along the side of the lawn mower, whereby the function of the trimmer can be utilized without at the same time having to permit the edger to continue to rotate.

This invention is not to be limited to the exact form of the embodiment shown in the drawings for illustrative purposes, for obviously changes can be made therein within the scope of the following claims.

I claim:

1. A grass edger and trimmer attachment for a power mower having a housing with a downwardly extending skirt and having an engine with a drive shaft extending into the housing and supporting cutter blades located within the skirt, comprising:

a bearing adapted to be mounted on but outside the housing and supporting a vertical trimmer shaft extending below the skirt;

a trimmer hub on the bottom portion of the trimmer shaft and supporting flail members operative for trimming grass adjacent to the skirt when the shaft and hub are rotated;

a first pulley on the drive shaft and a second pulley on the top portion of the trimmer shaft, the skirt having a slot therethrough located between the pulleys;

a drive belt extending through the slot and around the pulleys; and an edger assembly including an arm supporting a bearing, the arm having an inner end adapted to be hinged hinged to the housing near the slot, and the arm supporting an edger shaft in the bearing which shaft extends beyond the outer end of the arm, and the edger assembly further including an edger hub with flail members attached thereto and mounted on the outer end of the edger shaft and a friction drive wheel mounted on the edger shaft, the arm being hinged to the housing in such a location that when the arm is pivoted to a position wherein the edger shaft is substantially horizontal the friction drive wheel rides on the top of the second pulley and drives the edger hub and flail members.

2. An edger and trimmer attachment as claimed in claim 1, wherein said edger includes spring means urging the arm to pivot into said horizontal position wherein the drive wheel engages the top of the second pulley.

3. An edger and trimmer attachment as claimed in claim 2, further including releasable means carried by the housing and engageable with the arm and operative to hold the arm in a raised disengaged position.

4. An edger and trimmer attachment as claimed in claim 1, further including an idler rotatably carried on a control arm pivotally supported in the housing in such a position that the arm can be pivoted to press the idler against the drive belt to tighten it on the pulleys to thereby drive the attachment shafts; and control means operative to selectively position the arm.

* * * * *